June 9, 1931.  L. FOVAL  1,809,685

ANCHOR FOR TYPEWRITERS

Filed April 21, 1930

Inventor

Lotus Foval

By Clarence A. O'Brien
Attorney

Patented June 9, 1931

1,809,685

UNITED STATES PATENT OFFICE

LOTUS FOVAL, OF MAPLEWOOD, MISSOURI

ANCHOR FOR TYPEWRITERS

Application filed April 21, 1930. Serial No. 446,056.

This invention relates to a device for anchoring a typewriter to a desk, table or like support for preventing casual displacement of the typewriter during use of the same.

The primary object of this invention is to provide an anchor for typewriters, the anchor comprising a pair of relatively adjustable interconnected sections, each of which section is provided with means for gripping a leg of the typewriter, said sections being further adapted to be rigidly secured to the support upon which the typewriter rests thus retaining the typewriter in position against movement on the support.

A still further object of the invention is to provide, an adjustable anchor for typewriters of the character above mentioned which is adapted for use with any of the known makes of typewriters now in use.

Other objects and advantages of the invention will become apparent during a study of the following description, taken in connection with the accompanying drawings, wherein:—

Figure 1:
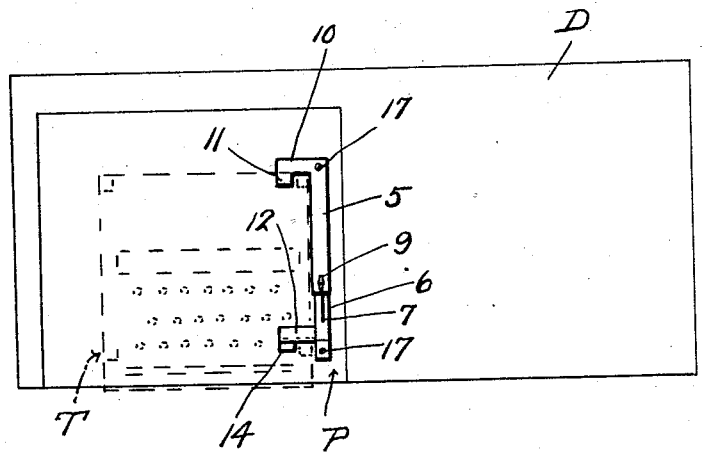
Figure 1 is a top plan view of my improved anchor showing the same in use.
Figure 2:
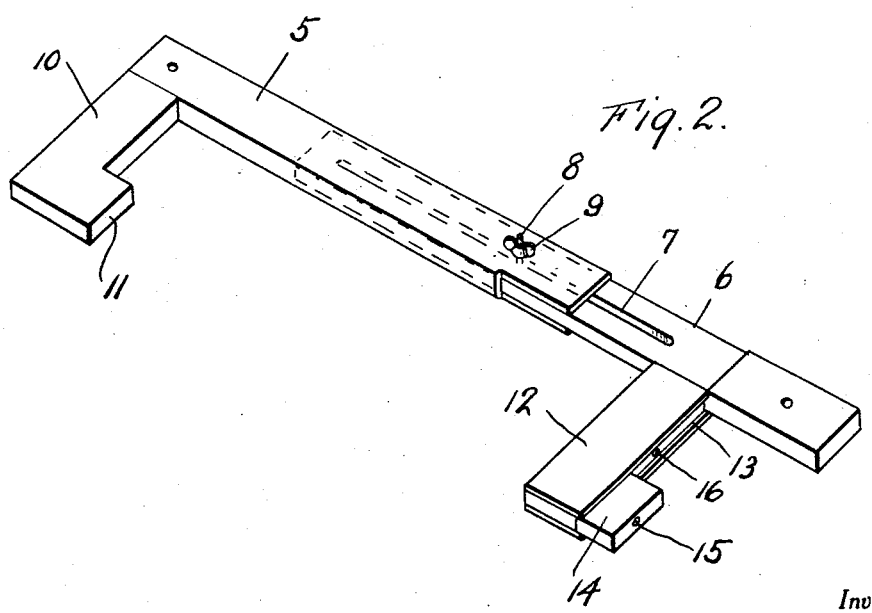
Figure 2 is a perspective view thereof.

With reference more in detail to the drawings, it will be seen that my improved anchor comprises a pair of bars 5 and 6 telescoping, the section 5 being hollow and open at one end, and the section 6 being substantially solid and having a portion thereof slidable within the hollow section 5. Said section 6 is provided with a longitudinally extending slot 7 and a pin or bolt 8 extends through opposite sides of the section 5 and the slot 7, a wing nut 9 being threaded on the projecting end of the bolt whereby the sections 5 and 6 may be maintained in relatively adjusted position. The member 5 at its free end has projecting laterally from one side thereof a hook-like extension embodying a shank portion 10 projecting at right angles from the section 5 and at its free end terminating in an inwardly directed extension 11 forming the bills of the hook. The hook on said outer end of the section or member 5 is adapted to engage the rear corner leg of the typewriter T shown in dotted line in Figure 1, while the section 6 inwardly from its free end has an arm 12 projecting laterally therefrom parallel to and co-extensive with the shank portion 10. The arm 12 on that longitudinal edge thereof farthest remote from the shank 10 is provided with a groove 13 within which is slidable a leg engaging block 14, the arm 12 adapted to extend rearwardly of the forward corner leg on a corresponding side of the typewriter with the leg disposed between the free end of the section 6 and the leg engaging block 14. The leg engaging block may be held in any predetermined position within the groove 13 in spaced parallel relation with the free end of the section 6, through the medium of a set screw 15 extending therethrough and adapted to be threaded within suitable openings 16 formed in the base wall of the groove 13.

Furthermore, each of the sections 5 and 6 adjacent their free ends are provided with suitable openings whereby the anchor may be secured to the disappearing typewriter supporting platform P of the desk or suitable support D by the means of screws or other suitable securing devices designated generally by the reference character 17.

While I have shown the anchor device used for anchoring in position a typewriter on the disappearing platform of a conventional type of typewriter desk it will be apparent that the device is admirably adapted for securing a typewriter against casual displacement upon an ordinary table or disk, and furthermore it is apparent that by shifting the block 14 the forward corner leg of the typewriter will be freed whereby the typewriter may be removed without necessitating a removal of the anchoring device, but which when engaged with the anchoring device will be held firmly in position on the table or like support.

Even though I have herein shown and described the preferred embodiment of my invention, it is to be understood that the same is susceptible to changes fully comprehended by the spirit of the invention as described and the scope of the appended claims.

Having thus described my invention, what I wish to claim as new is:—

1. An anchor for typewriters comprising a bar, means for fixedly securing the same to a support, an arm extending laterally from the bar intermediate the ends of the latter, a block slidably engaging said arm and co-operable with an adjacent portion of the bar for clamping therebetween a leg of the typewriter and means for retaining the block in engagement with the arm against casual movement relative thereto.

2. An anchor for typewriters comprising a bar, means for securing the same to a desk or the like, an arm projecting laterally of the bar in the plane of the bar, a block, said arm provided with a groove slidably accommodating one edge portion of the block, said block adapted to co-operate with an adjacent portion of the bar for clamping therebetween a fixed part of the typewriter and means for retaining the block in a predetermined adjusted position.

3. An anchor for typewriters comprising in combination, a longitudinally extensible member, a hub integral with the member adjacent one end thereof, an arm integral with the member adjacent the opposite end thereof and provided with a groove, a block slidably engaging the groove and capable of co-operation with the member for clamping therebetween a fixed part of the typewriter, and means engageable with the block and arm for retaining the block against casual movement relative to the arm.

In testimony whereof I affix my signature.

LOTUS FOVAL.